Aug. 21, 1962

L. D. HARMON 3,050,711

AUTOMATIC CHARACTER ANALYZER

Filed Feb. 26, 1959

INVENTOR
L. D. HARMON
BY
ATTORNEY

Aug. 21, 1962

L. D. HARMON

3,050,711

AUTOMATIC CHARACTER ANALYZER

Filed Feb. 26, 1959

INVENTOR
L. D. HARMON
BY
A. E. Hirsch Jr.
ATTORNEY

Aug. 21, 1962   L. D. HARMON   3,050,711
AUTOMATIC CHARACTER ANALYZER
Filed Feb. 26, 1959   5 Sheets-Sheet 3

INVENTOR
L. D. HARMON
BY
*A. E. Hirsch Jr.*
ATTORNEY

Aug. 21, 1962

L. D. HARMON 3,050,711

AUTOMATIC CHARACTER ANALYZER

Filed Feb. 26, 1959

INVENTOR
L. D. HARMON
BY
A. E. Hirsch Jr.
ATTORNEY

FIG. 14

INVENTOR
L. D. HARMON
BY A. E. Hirsch Jr.
ATTORNEY

United States Patent Office 3,050,711
Patented Aug. 21, 1962

3,050,711
AUTOMATIC CHARACTER ANALYZER
Leon D. Harmon, Plainfield, N.J., assignor to Bell Telephone Laboratories, Incorporated, New York, N.Y., a corporation of New York
Filed Feb. 26, 1959, Ser. No. 795,649
18 Claims. (Cl. 340—146.3)

This invention relates to the automatic recognition and identification of two-dimensional figures, and more particularly to apparatus for effecting the recognition and classification of visual characters essentially independent of their size, exact form or position, and rotation.

A principal object of the invention is to obtain reliable, fully automatic apparatus for translating handprinted or machine-printed numerals, alphabetic letters, or other visual stimuli into unique electrical or mechanical activity. This includes among other translations, the direct conversion of hand-printed information into a form suitable for utilization in automatic printing equipment such as electrically operated typesetters and typewriters.

There is great need for accurate, high-speed, and flexible devices for automatic character or pattern recognition. In business machines and the like, printed figures or hand-printed Arabic numerals and alphabetical letters, hereinafter referred to as alpha-numeric characters, must be translated into the "language" of the machines, i.e., into language capable of being utilized to control the computer or data processing system into which the data is to be entered. Printed or written character readers and the like eliminate the necessity for human labor in the translation process and substitute therefor reliable high-speed automatic translating means. Present approaches to automatic visual recognition are found in the so-called printed-character readers, line-drawing recognition machines, and in various tracking and navigation systems.

Because of variations in size, shape, and orientation of characters, particularly those produced by hand, it has heretofore been difficult for a machine invariably to translate the form of a character into computer language despite such variations, i.e., to imitate the human ability to recognize a wide variety of patterns indicative of the self-same character. Thus, while a human operator can reliably recognize characters written by a great many different hands or printed by a wide variety of type fonts, most automatic devices have limited utility because they are critically dependent upon the figure size, style, and orientation. Nevertheless, they serve a useful purpose and provide reliable, high-speed recognition of alphanumerics of one fixed style where size and rotation must be held within close tolerances.

These and other recognition systems must perform certain transformations on ensembles of input signals which contain patterns to be recognized. All members of a given class of patterns must have similar transforms. Such processing amounts to the deletion of nonessential features and the preservation of some set of predetermined essential features or invariants. However, the transformation principles employed by most prior art machines are not very general or easily extendable. It is evident that the recognition of visual patterns is most valuable when the apparatus is not restricted to use with a narrow set of input signals. Thus, the apparatus should be able to identify an A or a triangle irrespective of position, rotation, size or precise style. The ultimate machine should recognize the symbol 5 whether it is continuous or in two parts and whether it has been printed by a machine or scrawled by a human being.

It is important to find relatively simple ways to perform these tasks. Preferably, the apparatus provided to carry them out should be both flexible and economical, and be adapted to accept a large variety of inputs. Accordingly, the desire for automatic reading of postal addresses, income-tax forms, bank checks, train car markings, and the like must be met by machines using more powerful algorithms than those presently available.

It is another object of the present invention to specify useful transformations which are both flexible and extendable, and hence, powerful. A further object is to provide suitable apparatus for generating and using these transformations.

In seeking to assure a set of useful transformations, it is in accordance with the present invention to determine and classify what may be termed the essential features of input data. According to the invention, the identification of a wide variety of visual characters irrespective of rotation, position, style or size is made in real time and space and is based on the use of abstractions, i.e., on a simplifying recoding of the original data. It is to be noted that symbol identification or pattern recognition by human beings is similarly based on the use of abstractions, data reduction and classification. In the machine reader it is not mandatory, however, that there be any consistency between the rules used by human beings and those used by the machine either for the recognition of the "elements" of a symbol. Identification of parts of a whole pattern may accordingly be achieved by many different methods. It is only the rules for relating these parts which must be invariant so that different observers will ultimately agree. Hence, the operational rules for machine detection of straight line segment or an acute angle need not resemble those employed by a human observer.

Since the identification of alpha-numeric characters can be greatly simplified if the analyzer is completely independent of the rotation of the character, and further since simplification results if the physical size of the character within limits is not important, characters are examined in the present invention without concern for their exact size or rotation. Hence, such information is not considered as essential features in the formulation of operational rules.

It is still another object of the present invention to employ, in an automatic character analyzer, an examination pattern, as by scanning, which is virtually insensitive to character orientation, size, and exact form for providing essential information for recognition. Notwithstanding deliberately introduced insensitivity to certain information, those essential features necessary to identify a character positively and reliably, are nevertheless produced in an examination of the pattern with the particular scanning pattern to be described fully hereinafter.

To derive the essential features necessary to classify a pattern, be it a closed loop figure or an alpha-numeric character, the pattern is examined in the present invention by means of a dilating circular scan progressing from a point near the pattern's center of gravity outwardly past its boundary limits, or vice versa. Signals produced as the scanning trace interrogates the various portions of a character are registered to provide an electrical indication of the spatial location of the point. The registered signals are classified according to a particular schedule and the topological relation between elements is analyzed to provide a unique identification of the character. For a classification of simple closed loop symbols such as $n$ sided polygons, the analysis is based merely on the number of vertices in the symbol. Since the sequence of signals derived in scanning with a dilating circular pattern produces for each vertex encountered, converging traces forming cusps or the like, identification is achieved merely by counting the cusps. For more complex symbols, such as alpha-numeric characters, the analyzer examines other and different indicia in the set of signals produced in one scan, and bases the identification on the detection of certain prescribed signal relationships uniquely related to the pattern. The indicia may include, for example, concave segments and convex segments, i.e., sequences of signals having progressively more positive or more negative slopes, and interruptions in the sequences. Alternatively, a time-position determination for each boundary of the character may be registered, and these together analyzed for characteristics indicative of previously established reference criteria.

The invention together with other objects and features and its various advantages will be more fully apprehended from the following detailed description of preferred illustrative embodiments thereof taken in connection with the appended drawings in which.

Before discussing the construction of the apparatus itself, it is advisable first to discuss certain relations which hold among the elements of most alpha-numeric characters and a specific examining technique which is employed in the invention to turn the relations to account in the construction of the apparatus.

As suggested above, an alphabet of simple line-trace figures or alpha-numeric characters presented for detection must be interrogated in a fashion that yields similar sets of signals for geometrically similar figures independent of their absolute size or rotation. This is accomplished readily with a dilating or contracting circular scan of radially symmetrical picture elements. Consider an array of photosensitive transducer elements arranged in $c$ concentric rings having $r$ elements in each ring. If all of the transducer elements in each ring are simultaneously inspected, and if the several rings are inspected sequentially, for example from the center outward, $c$ sequences of $r$ signals occur. Effectively, this is a dilating circular pattern concentric with the center. It is evident that such scanning converts size changes to changes in time, and converts rotational changes to simply detected linear translations. A logically equivalent implicit scan is, of course, possible with a unidirectional propagation along radii and with suitable delays inserted between adjacent elements on each radius.

Figure 1:
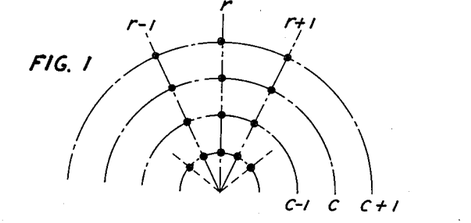
FIG. 1 is a diagram illustrating the disposition of individual transducer elements in a radially symmetrical array.

The dilating or contracting circular scanning pattern may be produced either by mechanical or by fully electronic means. Preferably a fully electronic optical signal transducer is employed for processing patterns with essential parallel logic. The transducer in an illustrative embodiment comprises a mosaic containing a plurality of independent photosensitive cells. A portion of such a mosaic is illustrated in FIG. 1. For radial symmetry the individual cells may be arranged as described above in $c$ concentric rings with $r$ receptors in each ring. The rings are sequentially inspected by commutation or the like from the center outward to produce $c$ sequential sequences of $r$ signals. In a typical example the transducer employs thirty-two rings of receptors with sixty-four cells in each ring.

Figure 2A:
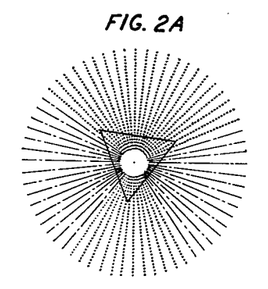
FIGS. 2A and 2B show, respectively, a closed line-trace character positioned on an analyzer field and a graphical display in Cartesian coordinates representing the points of intersection of transducer elements with portions of the line-trace character.

For the case in which an equilateral triangle, for example, is centered upon the array, as shown in FIG. 2A, the first intersections of the scanning interrogation ring with the figure is three simultaneous intercepts on the midpoints of the sides of the triangle. As the scan continues its outward sweep, points on each side of the initial intersections are progressively encountered. The last parts of the triangle which are inspected are the vertices, i.e., those points at the greatest radial distance from the center. Thus, the outward dilating scan produces three radially equidistant epicenters of activity. An accumulating register containing $r$ places representing the $r$ elements of each ring in turn displays three active cells. Initially the active cells are equally spaced along the length of the register. Eventually, there is a spread of activated cells in each direction from each of the initial locations. Finally the apices of the equilateral triangle cause the last three cells of the register to be activated. Again these are equally spaced in the register representing the 120 degrees radial symmetry of the vertices.

Figure 2B:
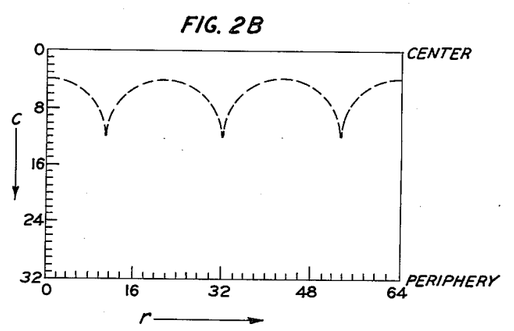

The sequence of scanning events and the various usable detection criteria are considerably easier to visualize if a simple transformation to rectangular coordinates is performed. Thus the points of intersection of the photocell receptors with portions of the character may be displayed on a rectangular grid or the like. The rectangular grids shown in FIG. 2B represent the points of intersection in the respective patterns produced by a single circular scan. The rectangular pattern is obtained by "unfolding" the circular array after making a cut from the center to the top of the array. Points along the top of the rectangle represent points on the inner circle of the photocell matrix, while the bottom line contains the points forming the periphery of the circular array. The left and right vertical edges of the rectangle represent the two edges along which the cut was made, i.e., the edges which were coincident in the original circular array. The expanding sweep circle is represented by a horizontal line which is sixty-four cells wide moving down in time through thirty-two positions. Any given horizontal line may be thought of as the contents of a sixty-four place register at any epoch. Each activated receptor location on the circular array is represented as a dot in the rectangular array. A contiguous series of energized cells, represented by a series of dots in the vertical direction, is an indication of the thickness of the line being encountered. In this manner it can be seen that size changes appear as vertical (time) shifts while rotational transformations cause lateral displacements of the pattern. Since the left and right edges of the rectangular grid are actually continuous in the original array, lateral displacements simply extend around the rectangular grid disappearing from one vertical edge and reappearing at the other.

The signal sequences produced in a single scan can, by virtue of the Cartesian plot, be viewed as time varying linear patterns in which properties exclusively common to each character may be detected. For the triangle for example, three radially equidistant epicenters of activity, sufficient to identify the character, are apparent. It is in this form that information characteristic of the pattern is stored in a register prior to analysis.

From a consideration of the rectangular coordinate graph, it is evident that a similar but smaller triangle than that shown in FIG. 2, results in similar signals earlier in the sweep cycle; conversely for a larger presentation. Furthermore, it can be observed that rotational changes are represented as lateral shifts in the contents of the register. Thus, the detection of the three equidistant cusps, or, alternatively, three uniformly expanding waves of activity is sufficient to identify an equilateral triangle independent of size or rotation. An isosceles triangle will generate easily detectable time and position asymmetries. Squares and rectangles may be differentiated in a similar manner; their unique common property being, of course, the presence of four epicenters of activity, or simply, four vertices. A convex polygon of any number of sides can be detected utilizing these data, given sufficient resolution in the analyzer means. Circles may be detected by noting a simultaneous or nearly simultaneous filling of all places in the inspected register, that is, an essentially horizontal line over the entire rectangular graph. The vertical position of this line on the graph indicates, of course, the diameter of the circle. Although bounds on size of course exist, the lower limit is fixed only by the resolution of the array of elements and the upper bound is determined by the visual field encompassed by the array.

The alphabet of line drawings recognizable by this technique is not restricted to a few polygons. Many figures have unique elements which are invariant if the character is interrogated with an expanding circular scan whose origin is at or near the center of gravity of the figure. These essential elements, which may include various metrics such as concavity, convexity, center of gravity and the like, afford satisfactory means for obtaining recognition of a large class of symbols. Thus, for example, the detection of concave and convex segments distributed in time and space leads to a complete identification of a large class of alpha-numeric characters.

The following test for the triangle shown in FIG. 2, representative of $n$-gons in general, illustrates the principles involved in analyzing the character, but should not be considered the most complete or effective rule which can be found. It is assumed that the character is centered and stationary. The beginning of each sweep initiates the storage of indicia, each one of which, at the end of the sweep, may be read out as a voltage level which is proportional to the radial distance of the corresponding image point from the center of the array. At the end of a sweep a comparator need only detect and count the number of peaks, or maxima, in the stored information. A simple count of such peaks is sufficient to identify an $n$-gon while a measurement of the interpeak distances given by the addresses of the radii on which the peaks occur establishes criteria for separation of isosceles and equilateral triangles or of squares and rectangles. For the recognition of alpha-numeric characters, other similar differentiating rules, discussed hereinafter in the consideration of FIGS. 10 through 13, may be derived.

Figure 3:
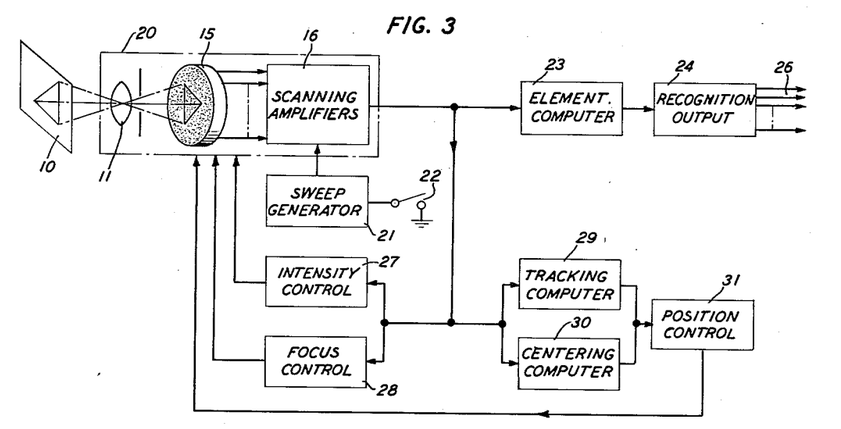
FIG. 3 is a block schematic diagram of an automatic character analyzer according to the invention.

Referring now to the apparatus drawings, FIG. 3 shows a system for automatically recognizing and identifying two-dimensional geometric figures in accordance with the techniques and transformations described above. The system illustrated is suitable for analyzing simple line drawings including closed figures such as polygons and open figures such as the ten numerals and is in principle extendable to more complex characters such as the letters of an alphabet. In the apparatus of FIG. 3 a character 10 to be analyzed is examined by means of a character scanner 20 wherein a dilating circular scanning pattern is generated. The dilating scan is initiated by energizing sweep generator 21, for example, by means of a switch 22 which may be a portion of an automatic control circuit or simply a hand activated switch. Intersections of the scanning pattern with elements of the character being interrogated are converted into electrical pulses which are transmitted to an element computer 23 wherein the pattern is classified according to the essential features contained in the sequence of applied pulses. Signals representative of these features are examined in comparator circuit 24, and, in dependence on the outcome of the examination, an output signal is generated which is indicative of one particular class of characters. The outputs may typically appear on one of a plurality of output leads 26 representative respectively of the stored ensemble.

As discussed above, the dilating or contracting circular scanning pattern employed in scanner 20 may be generated by either mechanical or fully electronic scanning means. In a preferred embodiment of the invention a plurality of independent photoconductive transducer elements 15, referred to hereinafter simply as photocells, of the sort described in a copending application of L. D. Harmon and C. F. Mattke, Serial No. 781,627 filed December 19, 1958, is employed to produce the dilating scan. The photosensitive transducer described in the above-mentioned application comprises an array of miniature, densely packed photocells deposited on the plane end surface formed by stacking a number of printed circuit cards together. Each card contains a plurality of etched wires normal to the ends of the cards supporting the cells. By utilizing printed circuit techniques a great many individual cells each with an independent external connection may be produced in an extremely small area. For example, each cell employing cadmium sulphide or the like as the photoconductive material may be approximately twelve-thousandths of an inch in diameter so that over five thousand independent cells occupy an area of no more than one square inch. A typical transducer with radial symmetry contains 2048 independent cells within a two inch diameter surface.

In the description to follow it will be assumed that a radially symmetrical transducer with 2048 cells is employed in an array of thirty-two concentric rings $c$ with sixty-four elements $r$ in each ring. The transducer 15 is commutated both to provide the expanding circular scanning pattern originating at or near the center of gravity of the character, and to generate signals representative of intersections with portions of the character. A logically equivalent implicit scan may be produced with unidirectional propagation along radii and with suitable delays inserted between adjacent elements on each radius. In either case the sets of rings are effectively commutated, and that ring which is activated at any instant only delivers simultaneously $r$ output signals. These signals may be amplified in amplifiers 16 and stored in a register or the like. As previously shown, for circular scanning of this sort, rotational changes appear only as lateral shifts in the contents of the register. Commutation means for producing scanning action of this sort will be described more fully hereinafter in connection with a description of the apparatus depicted in FIGS. 4, 5, and 6.

Alternatively, a dilating circular scan produced in a flying spot scanner or the like may be employed to interrogate a character. The variations in reflected light resulting from such a scanning process are picked up by a photomultiplier tube, amplified and buffered to produce parallel or simultaneous read-out of the signals in concentric rings. The signals again are stored in a register. The register itself may, of course, supply the buffering action.

Since the approximate center of gravity of a character must be determined prior to the scanning for identification of the element, automatic positioning control circuits may be employed. Thus, before a character is identified, it is suitably positioned in juxtaposition with the character scanner 20. Normally this orientation is obtained by means of an additional scanning cycle or cycles and appropriate servo apparatus. Preliminary registration and orientation is achieved by detecting, in the auxiliary scanning cycle, the position of the outer boundaries of the character and then by generating suitable X and Y shift voltages either to move physically the platen supporting the character 10 or the effective centering of scanning itself. The auxiliary scanning pattern need not be circular but may be rectilinear, radial, spiral, or the like. One centering system entirely suitable for the practice of the invention is described in an article entitled, "Reading by Electronics," published in Wireless World, April 1957 at page 175. Similarly, suitable tracking apparatus may be used if the character field is not stationary. Since an object moving across the field produces detectable transient signals in the receptor array used in the scanner, information derived from the location of these transients provides sufficient information for estimating a discontinuous tracking jump which may be used to center the target. Electronic systems for maintaining synchronism between signals developed by a fixed transducer and a moving target are well known in the art.

The following detailed description will be greatly simplified by considering only the case of a motionless field and stationary transducer. Furthermore, it will be assumed that the field is initially so oriented in relation to the transducer as to permit the dilating scan to commence at or near the center of gravity of the character under interrogation.

A self-regulating light-level system may be employed, if desired, to insure that the photo-receptors in the transducer operate at or near some optimum level. An automatic control circuit may be adapted to do this and additionally to protect the receptors against excessive illumination. Proper focus may be maintained automatically if desired by adjusting the lens-image plane distances in accordance with the degree of image definition.

Information for achieving suitable control of intensity, focus, and position may be derived directly from the character scanner 20 and supplied to an intensity control circuit 27, a focus control circuit 28, a tracking computer 29 and a centering computer 30. Information derived from the intensity control circuit 27 is applied directly to the scanner 20 to alter the degree of illumination instant on the character 10 or to suitably adjust an iris or the like between the character and the photo receptor 15. Signals derived from the focus control 28 may be employed to alter the lens-image distance to maintain sharp focus. The tracking and centering computers 29 and 30 together supply sufficient information to position circuit 31 to permit correction voltages to be produced for compensating for motion of the character and for establishing the proper relationship between the scanner and the character prior to each dilating scan.

Figure 4:
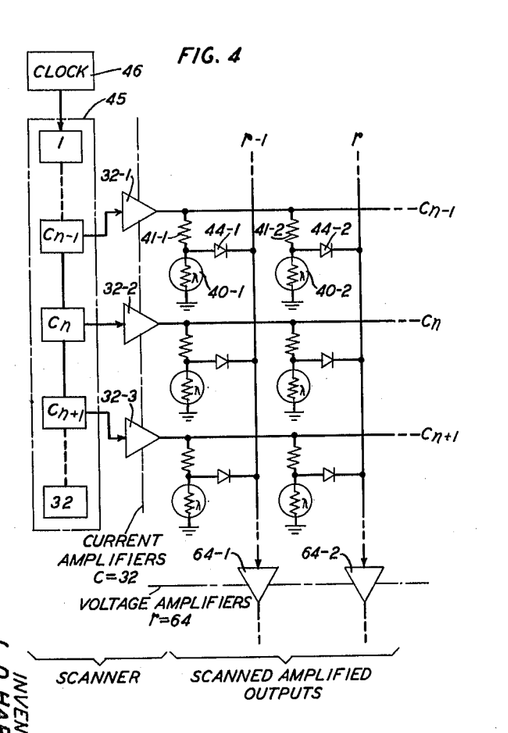
FIG. 4 is a schematic circuit diagram of typical apparatus for producing a dilating circular scanning pattern in a matrix of radially disposed transducer elements.

FIG. 4 illustrates one suitable means for commutating the independent cells of a transducer to produce a dilating circular scan. Interrogation of the photocells 40 is accomplished by sequentially switching a supply voltage developed across load resistors 41 from current supplied by a series of amplifiers 32, for example, to each of thirty-two rings of photocells. That ring of cells which is activated at any instant transfers the voltages produced across the photocells contained in that ring to the inputs of sixty-four amplifiers 64 associated with the respective rings. Necessary buffering and amplification of these signals is accomplished, for example, by transistors which are current driven by the high impedance photocells. Since only one ring of sixty-four cells is inspected at any given time, only sixty-four amplifiers are required. An isolating diode 44, associated with each photocell, is employed for insuring that all uninterrogated cells are locked out.

Commutation is produced by energizing the thirty-two driver amplifiers in sequences as by a clock and counter. The decimal counter 45 is energized by pulses emanating from a clock source 46 and supplies on its output leads a sequence of voltage pulses suitable for triggering the corresponding current amplifiers 32. Thus, as the first of the counters is energized by a pulse from the clock, that lead and only that lead carries an output current to an amplifier 32. A similar pulse appears in sequence on each of the leads of the counter. Although a simple decimal counter with thirty-two stages is satisfactory for producing the required sequence of pulses for an array of photocells arranged in thirty-two rings, it is obvious that a binary counter need have only five stages to accomplish the same result. If a binary counter is used, however, a decimal converter must also be employed to produce thirty-two suitable energizng pulses.

If it is assumed that the character is suitably centered and stationary prior to interrogation, the frequency of clock 46 may be very high, i.e., very fast scanning may be used. Typically, a frequency of one megacycle per second is satisfactory.

Figure 5:
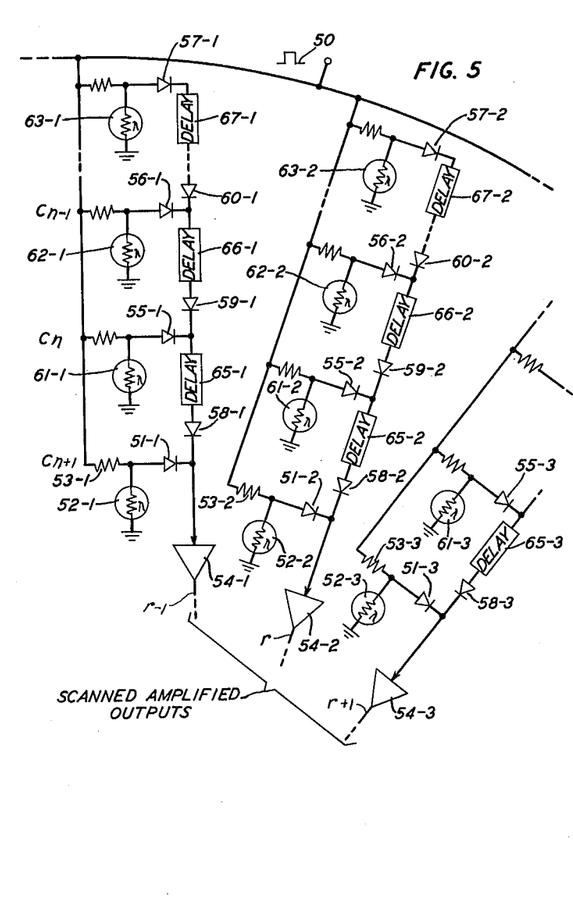
FIGS. 5 and 6 are schematic diagrams illustrating alternative apparatus for producing circular scanning patterns.

Other and perhaps simpler means may be utilized for producing commutation of a circular array of photocells. For example, FIG. 5 illustrates schematically apparatus for producing a dilating circular scan without resort to the clock and counter arrangement previously described. Scanning of the photocells is achieved by means of the unidirectional propagation of an interrogation pulse produced, for example, in a pulse generator triggered at the commencement of each scan cycle. The pulse is directed simultaneously along all of the radii of cells in the transducer. Initially, the pulse 50 establishes sufficient forward bias to permit the isolating diodes 51 to pass the accrued voltages dropped across load resistors 53 by photocells 52 to the radial buses leading to amplifiers 54. Each of the amplifiers 54 is associated with one radially disposed group of cells. Simultaneously, the diodes 55, 56, 57 and all other similarly positioned diodes are momentarily biased by the pulse 50 to their forward conducting conditions to permit the voltages produced across the load resistors associated with all of the photocells 61, 62, 63 to appear at points on the radial buses coincident with the indicated cathode terminals of the diodes.

The photocell voltages so developed reach the corresponding amplifiers 54 in sequence following the arrival of the voltages developed by load resistors 53. Delay elements 65, 66, and 67, respectively positioned between adjacent photocell networks in the buses, provide the delay intervals necessary to achieve the appropriate sequencing of pulses. Thus, the voltages produced by photocell devices 61 pass through diodes 55 and delay elements 65 subsequently to reach the plate terminals of diodes 58. If sufficient time has elapsed, however, the influence of pulse 50 is no longer present and diodes 51 are once again reverse biased to present an open circuit condition. Hence, diodes 58 are biased in their forward direction and pass the signals developed by photocells 61 to amplifiers 54. Similarly, diodes 59, 60 and the like are forward biased while, in the absence of pulse 50, diodes 55, 56, 57 and the like are once again reverse biased. The voltages developed in photocells 62 and 63, thus pass respectively through delay elements 66 and 65, and through the series of delay elements 67, 66 and 65 to appear in sequence at the input terminals of amplifiers 54. Accordingly, the duration of pulse 50 is selected to be less than the delay interval imparted to generated voltages either by delay elements 65, 66 or 67.

Figure 6:
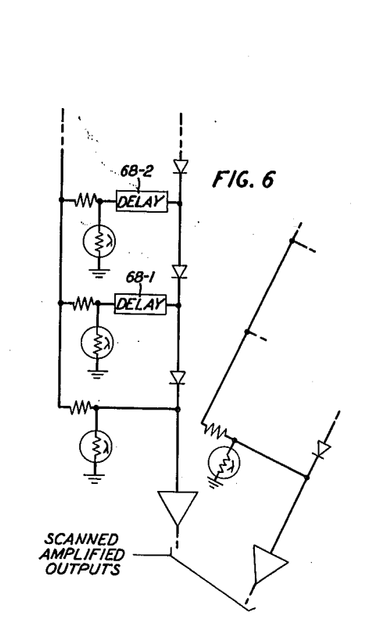

A slightly different configuration, shown in FIG. 6, is also satisfactory for producing a dilating circular scan. Here the delay elements 68 are inserted as shown in the circumferential paths between the photocells and their corresponding radial buses. The delay elements 68—1 and 68—2 are graduated to possess progressively greater delay times, e.g., 68—2 imparts to an applied signal a longer delay than does devices 68—1. The configuration shown in FIG. 6 utilizes fewer diodes than does the one shown in the previous figure.

Figure 7:
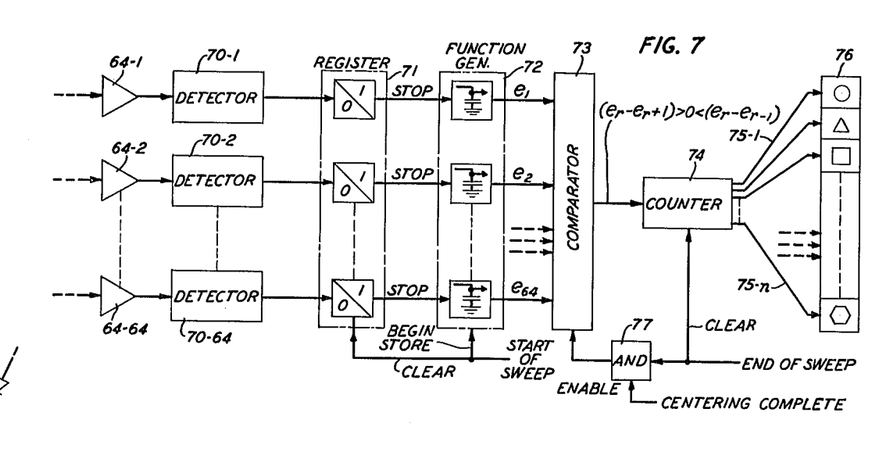
FIG. 7 is a block schematic diagram of an automatic analyzer for the recognition of an ensemble of polygons.

An automatic analyzer programmed for recognizing and distinguishing between a plurality of closed loop characters such as polygons is shown in FIG. 7. Output signals representing activated photocells detected in sequentially scanning individual rings in a circular transducer are passed by the amplifiers 64 to black signal detectors 70, each of which may comprise a threshold device or the like. The black detectors respond only to signals exceeding a predetermined threshold and indicate, when triggered, the occurrence of a black signal in a corresponding one of the sixty-four amplifiers. Connected to the output of each detector is a register 71, each cell of which responds to the black signal derived in a corresponding detector 70. Conveniently, each cell of the register may comprise a bistable device which changes state once a black signal is received and remains in that state until cleared as by an external voltage. The register is cleared typically at the beginning of each sweep so that all of the registers are initially in a zero state. Once a black signal is detected in the subsequent scan, the register shifts into its alternate state and remains there until once again cleared. In its second state the register emits a signal, termed a stop signal for convenience, which is applied to a corresponding function generator 72.

Figure 8:
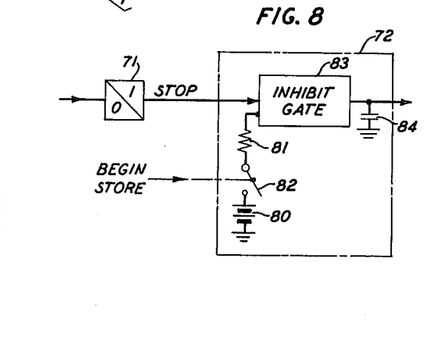
FIG. 8 is a schematic diagram of an accumulator circuit suitable for use in the apparatus of FIG. 7.

Each unit of the function generator 72 contains a charging circuit which registers a voltage proportional to the time elapsed between the initiation of a scan and the time at which a black signal is detected. Details of a suitable function generator are shown in FIG. 8. At the beginning of each sweep a uniform current is applied to the storage element of each function generator. This may comprise the capacitor 84 in FIG. 8. The current derived, for example, from battery 80 passing through resistor 81 when switch 82 is closed passes through inhibit gate 83 to charge capacitor 84 only in the absence of an inhibit signal from register 71. When the first black signal is detected, indicating that an active photocell has been interrogated by the expanding sweep, the register changes state to produce a stop signal. This "inhibits" gate 83 and, consequently, the build up of voltage in the capacitor ceases.

Thus, the capacitor builds up a voltage essentially linearly from the start of the sweep until inhibited by a black signal from the corresponding register 71. The final voltage accumulated and stored by the capacitor is therefore proportional to the radius of the black mark detected in the corresponding radius of the transducer array.

At the completion of the entire scan, the function generator 72 (referring again to FIG. 7) contains a stored pattern of voltages $e_1, e_2 \ldots e_n$ representative of the spatial distribution of black elements in the character being analyzed. These voltages are applied in parallel to a comparator circuit 73 which is enabled only at the completion of the sweep, providing centering is also complete. It operates to detect certain characteristic indicia which may, in turn, be interpreted as one of the number of characters in an ensemble. For closed loop characters, the comparator need only detect peaks of activity in the sixty-four generated functions. The operation may be performed by local differencing over several adjacent locations. Thus, each time the comparator senses that $e_r-(e_r{+}1)$ is a positive voltage and also that the $r^{th}$ voltage is greater than the $(r-1)$ voltage, that is to say $(e_r-e_r{+}_1)>0<(e_r-e_{r-1})$, a signal is passed to the counter 74. Such a condition indicates that a cusp or peak is present since the $r^{th}$ voltage is greater than its two adjacent neighbors. A simple count of the peak-indicating signals is sufficient to identify invariably an $n$-gon. The counter is provided with output leads 75 for each counting value to convey signals to indicator devices 76 or the like.

Figure 9:
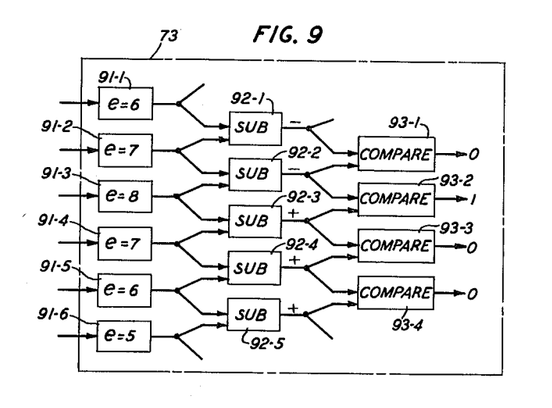
FIG. 9 is a block schematic diagram of a comparator circuit suitable for use in the apparatus of FIG. 7.
Figure 10A:
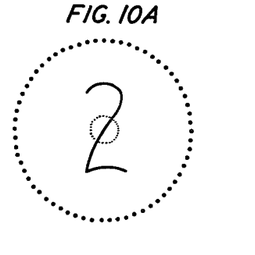
FIGS. 10A and 10B, 11A and 11B, 12A and 12B, and 13A and 13B show various representative numerical characters respectively positioned on representative analyzer fields, and graphical displays in Cartesian coordinates, illustrating the temporal distribution of scan-figure intersections.
Figure 10B:
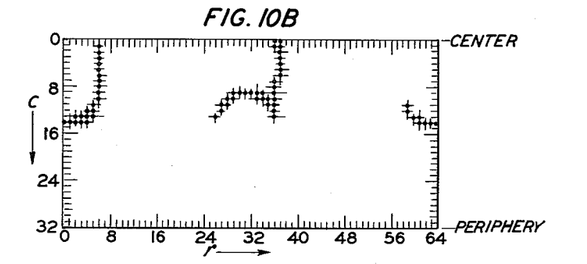

Alternatively, each voltage $e_r$ may be subtracted from the voltage $e_r{+}_1$ stored in the adjacent cell, the nature of the difference noted as plus or minus, and changes of sign counted and used as the indication of the character. Apparatus for performing this sequence of operations is shown in FIG. 9. In the example shown in the figure, a voltage equal to seven units, stored in register 91—2, is subtracted from a voltage equal to six units, stored in register 91—1. The negative difference is supplied by subtractor 92—1 as a "minus" signal to one input of a comparator 93—1. Similarly, each succeeding voltage stored in succeeding cells of register 91 are subtracted from their predecessors, in subtractors 92—2, 92—3 and so on, and the sign of each difference transferred, by pairs, to comparators 93—2, 93—4 and so on. The comparators are programmed to produce for like pairs of signs, either both positive or both negative, zero output, i.e., a "zero" pulse. For unlike signs in the applied signals, an output signal is produced, i.e., a "one" is indicated. The one and zero signals produced in comparator 73 are supplied in parallel to a counter which, in effect, adds the signals to establish a summation signal indicative of a number of signal peaks or the like. This detection method has the advantage that noise bursts, irregularities and the like can be effectively discounted because by basing the decision on several changes on both sides of the peak sample rather than on one decision only, immunity to irregularities is provided.

A measurement of the inter-peak distances indicated, for example, by the addresses of the radii on which the peaks occur, establishes sufficient criteria for the separation of isosceles and equilateral triangles or of squares and rectangles. A circle is detected by the simultaneous or nearly simultaneous filling of all sixty-four registers.

Returning to the apparatus of FIG. 7, as mentioned above, it is assumed that centering and tracking of the character under interrogation is completed before commencement of a scan. Once this condition is met a "start of sweep" signal, produced either automatically in the centering and tracking computers or alternatively by a manually operated interrogation switch or the like, clears the register 71, closes the switch 82 to begin the charge cycle in the function generator, and activates the circular scanner. The comparator 73, on the other hand, is enabled only after the sweep is completed. Thus, provided centering is complete, i.e., the preceding scan was not utilized solely for the centering operation, as evidenced by a "centering complete" signal and an "end of sweep" signal, AND gate 77 is energized. The comparator is then enabled thereby to effect the analysis outlined above. The end of sweep signal also clears and readies the counter 74.

Recognition apparatus for detecting and identifying the ten numerals (zero through nine) must perform several functions. Broadly, it must detect a reasonably small number of properties in the patterns which together include all of the members of a defined class, e.g., a particular numeral within the ensemble, and exclude all others. A number of these properties may be established from a consideration of rectangular plots of points established in circularly scanning a number of representative examples of members of the class.

Figure 11A:
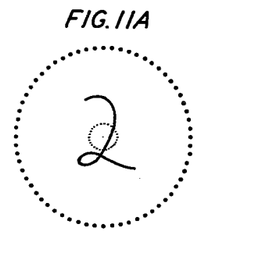
Figure 11B:
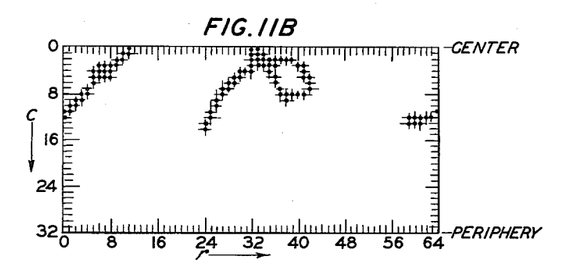
Figure 12A:
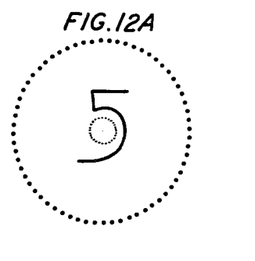
Figure 12B:
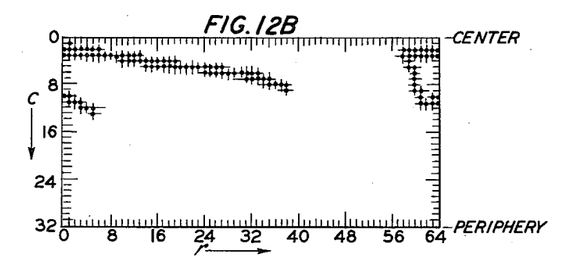
Figure 13A:
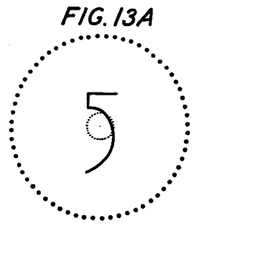
Figure 13B:
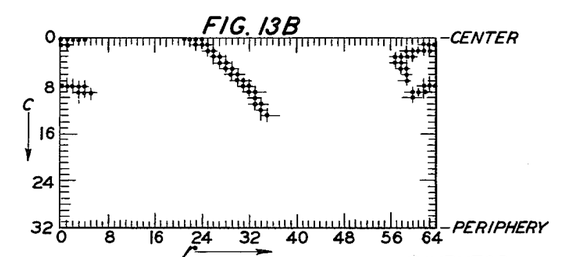

Consider now, for example, the numerals shown in FIGS. 10, 11, 12 and 13. FIGS. 10 and 11 show two examples, respectively, of the numeral "2" roughly centered on a circular mosaic of photocells, and FIGS. 12 and 13 show two representative examples of the numeral "5" drawn free-hand within the boundaries of the mosaic. Again two simplifications are assumed; the numerals are centered and there is no rotation. Rectangular plots of the characters, derived in a single scan, are shown to the right of each numeral. Properties common to the numeral 2 shown in the example, and indeed common to a great variety of other 2's, are found which are substantially different from those found in 4's or 5's. Once mutually exclusive tests are established for various character properties, which properties taken together, represent unambiguously one character and exclude all others, the resulting test program is sufficient to obtain automatic recognition of each of the characters so defined. If these tests are well chosen they are useful for recognizing any of a large class of such numerals, either handprinted or machine printed in a variety of styles. The following set of tests is satisfactory for illustrating the principles involved in recognizing an alphabet of numerals.

Most generally, numeral characters are typified by ascending or descending functions. An ascending function may be defined as a generally continuous substantially monotonic decrease in values of $c$ as $r$ increases. Conversely, a descending function is defined as an increase in values of $c$ as $r$ increases. For the 2 shown in FIG. 10A it can be seen in FIG. 10B that there is an ascending function for values of $r$ from approximately one to six; conversely, the first 5, shown in FIG. 12, has two descending functions for $r$ between one and six. In a similar manner, horizontal segments, concave or convex functions, and the like, may be described as they occur in each character. From these and like observations, it is found that the following characteristics in the topology must be detected to distinguish between the numeral 2 and the numeral 5:

(1) Ascending functions between $r=1$ and $r=8$. This describes the curved section of the upper right portion of most 2's.

(2) Ascending functions for $r$ between twenty-four and thirty-two. This describes the portion of a tail or a 2 lying to the right of center.

(3) Partially horizontal or ascending functions for values of $r$ between thirty-two and forty. The presence of at least a short segment which is level or rising during this interval indicates the left end of the tail or the bottom of the down stroke for most 2's and is independent of whether or not a loop is present.

(4) Two-valued functions for $r$ between one and eight and between sixty and sixty-four. This establishes the presence of the top bar and top of the curved portion of a 5.

(5) Descending functions for values of $r$ between sixteen and forty. This function describes the tail of a typical 5.

Two-valued functions may be defined as situations in which two or more separated cells in any one radius of cells are simultaneously activated.

It should also be noted that the limits on $r$ need not be taken as absolute. If the tests are based on relative $r$ values the results of the tests are independent of rotation of the sample numerals.

Rules based on the tests outlined above are sufficient to obtain unique recognition of the samples and, indeed, of a variety of other examples of these two numerals. The first three tests concern properties of the numeral 2 which are relatively invarient, and the fourth applies to practically no 2 and can be used as a highly probable exclusionary statement. Recognition of a 2 thus occurs only if tests 1, 2 and 3 are satisfied and 4 is not. Similar rules apply to all ten digits and may be established for the characters of the alphabet for which the apparatus is designed. The mechanisms required for applying such tests are derived from relatively simple extensions of the previously described system.

Apparatus for automatically recognizing and identifying numerals is, therefore, suitably programmed with rules of the sort outlined above. Thus, for example, descending and ascending functions positioned in preassigned locations are defined and stored in the apparatus. Similarly, the occurrence of two-valued functions in other preassigned locations is defined and stored.

Figure 14:
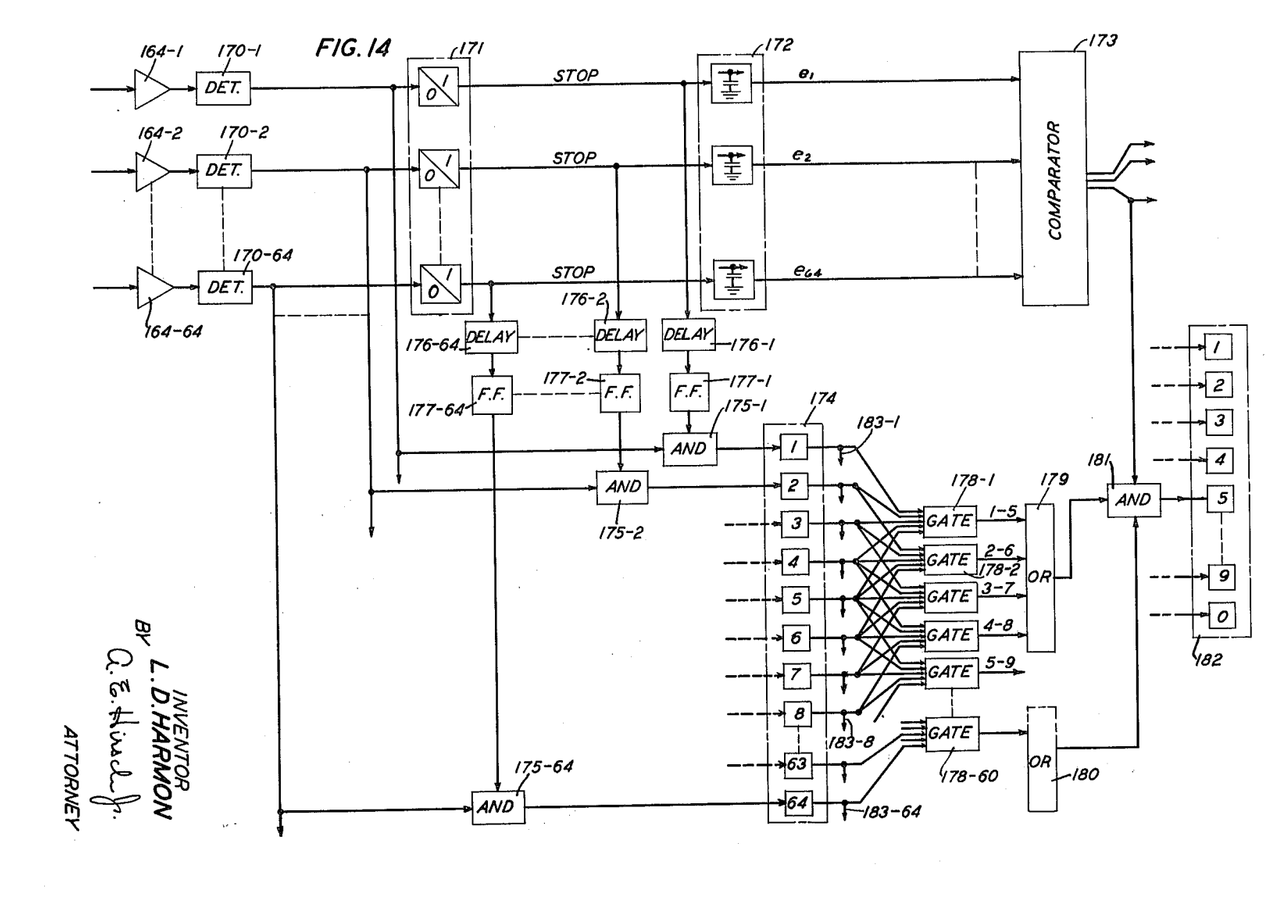
FIG. 14 is a block schematic diagram of an automatic analyzer for the recognition of an ensemble of Arabic numerals.

FIG. 14 shows apparatus programmed according to the rules set forth above. For the most part the indicia of recognition can be detected in a manner substantially identical to that outlined for the processing of information in the identification of polygons. Since the means employed in the polygon detecting apparatus to detect and record black signals occurring in each scan becomes inactive once a stop signal is detected, i.e., reverts to a stable state once a black mark has been encountered, it is no longer available to detect the occurrence of a second or third black signal in the same radius. Consequently, a supplementary register, which may be identical in all respects to the register 71 described previously, is employed to detect the occurrence of multi-valued functions. Any number of similar registers may be utilized to detect any number of black signal occurrences in any given radius, i.e., the system may be iterated as often as desired. Two registers, however, are sufficient for detecting the numerals 0 through 9.

Turning now to the apparatus shown in FIG. 14, that portion of the apparatus devoted solely to the recognition and identification of the numeral 5 from among ten such numerals is shown in detail. Similar apparatus is provided for the detection of other characters in an ensemble. Sufficient means is provided in the apparatus shown to establish three independent functions characteristic of the numeral 5. These are typically, first, a descending function for $r$ lying between sixteen and forty; second, a two-valued function for $r$ lying between zero and eight; and finally a two-valued function lying between sixty and sixty-four. Since the pair of two-valued functions occur respectively at the ends of the rectangular plot and that these edges are contiguous, it is evident that only one two-valued function need be established. Descending functions occurring between approximately six and forty are detected by apparatus substantially identical to that used previously. Thus, amplified signals derived from a transducer are applied by means of amplifiers 164 to black detectors 170 supplying registers 171 with information for each detected black signal in a single scan. The register cells accordingly change state and permit function generators 172 to record an indication of the positions at which the marks occur. These signals are supplied by the function generators 172 to a comparator circuit 173 wherein the descending function is detected. A circuit similar to that shown in FIG. 9 which is responsive only to signals supplied from the function generator within the range of sixteen through forty may be used for this purpose.

Once a black mark in any one radius is detected, the registers 171 are no longer available for detecting the second occurrence of a black signal. Accordingly, a second multicell register 174 is provided which detects such second occurrences. It is supplied with signals from black detectors 170 through conditional AND gates 175. The AND gates are arranged to pass detected black signals to the register 174 only providing a sufficient delay has occurred since the detection of a previous black signal. This conditioning is conveniently achieved by passing the stop signals produced by registers 171 through delay lines 176 and flip-flops 177. The delay times of the lines 176 are selected to be proportional to the scale of the rectangular pattern so that some desired minimum separation between pulses is insured. For example, in the numeral 5 the delay time is selected so that a thick crossbar in the numeral does not enable the AND gates but two fairly widely separated marks in the same radius do. The flip-flops 177 are reset at the beginning of each cycle and change state only after the delay period following the first detection of a black mark in registers 171.

As soon as both conditions are met, i.e., a suitable time interval has elapsed since the last detection of a black mark in one radius, and the second occurrence of a black mark in that radius, the corresponding segment of register 174 records the event. For the third occurrence of a black mark in any radius, additional registers and conditioning means may be used. Iteration of the registers is necessary for more extended ensembles, for example, one composed of letters of the English alphabet, but are not required for the recognition of numerals.

Since, in the detection of the numeral 5, the only additional information needed is an indication of the occurrence of a two-valued function occurring between one and eight, and another between sixty and sixty-four, a second function generator is not required. To the contrary, the indiction is provided merely by axamining the outputs of cells one through eight and cells sixty through sixty-four of register 174 following a complete scan to detect the presence of a mark. Theoretically, if a mark appears in any one, a two-valued function is indicated. However, to provide a degree of immuity from noise bursts and the like, it may be required that four or five contiguous marks be found within the overall range before a two-valued function is registered. Hence, a plurality of logical integration devices, such as plurality of AND gates 178, each supplied with the output signals derived from five consecutive registers is sufficient to detect the event. The gates 178 may include threshold devices so that they supply an output provided, for example, four of the five inputs are excited. This provides additional immunity to noise or errors occurring due to missing pulses, for example, thus also providing insensitivity to breaks or discontinuities in the line-trace. These slight errors, accordingly, are excluded from the final decision.

For the numeral 5, taken as an example, the outputs of AND gates 178—1 through 178—4 are applied to an OR gate 179 which emits a signal for a detected sequence of four contiguous pulses within the range one through eight. Thus, if four out of five or five out of five registers indicate the presence of a sequence of black signals, a second function is indicated. It may, however, be positioned either between one and five, between two and six, between three and seven or between four and eight. Accordingly, a sequence of marks in any one of the ranges is sufficient to activate OR gate 179. A similar series of gates (not shown) supplied with grouped information from registers 174—60 through 174—64 supply OR gate 180 with indications of the presence of a two-valued function in the interval sixty through sixty-four. The occurrence of a descending function within the interval sixteen through forty may be derived from comparator 173 in the fashion described in connection with FIG. 9.

In this fashion, indications of all three conditions are produced in the apparatus shown in FIG. 11; i.e., the presence of a two-valued function lying between zero and eight, a two-valued function lying between sixty and sixty-four, and a generally descending function between sixteen and forty. The signals corresponding to the fulfilment of the condition are combined in an AND gate 181 to provide a signal typifying the presence of a character 5. The signal is produced at the output of AND gate 181 only for one class of characters and thus may be used to excite an indicator 182 or the like.

In similar fashion rules are established for the detection of the other nine numerals, and apparatus is assembled accordingly to the particular program. In each case, however, information supplied only from black detectors 170 is sufficient to permit a unique identification to be made of each of the numerals. The typifying signals produced in corresponding apparatus for other characters in the ensemble may, likewise, be used to excite a portion of indicator 182. The indicator may, of course, be replaced by an automatic typewriter or the like.

It is to be noted that the processes of the detection system of the present invention depend on the detection of line segments whose length, slope, and continuity requirements are only broadly defined. This freedom from precise definition of these properties together with the multiple use of these properties provides great freedom from style, size changes and noise, and at the same time permits a great variety or alphabet of characters to be detected. Such aforementioned properties also make unnecessary precise alignment of the center of sweep with the center of the character.

For the detection of letters of the English alphabet, or the like, it is often necessary in the program to detect, in addition to the occurrence of two-valued function in a particular interval, ascending and descending segments within one or both of the two-valued functions. This is readily accomplished by employing a supplementary function generator, similar in all respects to generator 172. It is energized with stop signals derived from the cells of register 174, as by the vestigial leads 183 extending from the output lines of the cells of this register. A supplementary comparator, similar to comparator 173, affords the necessary decision regarding function activity. Thus the circuits described, for the detection of polygons or numerals, may be iterated a sufficient number of times to afford additional recognition of more complex indicia.

From the consideration of the scanning technique and the program logic employed in the practice of the invention it is evident that the detection of characters is largely immune to rotational changes. It is completely insensitive in the n-gon detection case, and may be made largely so in the alpha-numeric case. Since there is a wide latitude in the exact manner in which the logic elements, such as gates, may be combined to form the decision portion of the circuit apparatus, the degree of sensitivity may be controlled. For example, in the detection of a two-valued function lying between zero and eight in the example given above, the OR gate 179 responds if either cells 1, 2, 3, 4, or cells 2, 3, 4, 5, or cells 3, 4, 5, 6, or cells 4, 5, 6, 7, or cells 5, 6, 7, 8, are energized. This, in itself, allows a range of approximately five cells rotation in sixty-four, or approximately eight percent. Additionally, commutation of the register outputs may also be employed to permit all sixty-four cells in each ring to be progressively shifted, i.e., to provide one hundred percent rotation, if desired. Such commutation is, of course, made possible by the circular symmetry of the transducer array.

Although the invention has been described as relating to specific programs and apparatus relating to the recognition of specific alphabets, the invention should not be deemed limited to the programs illustrated nor the alphabets suggested in the various embodiments shown since various modifications and other embodiments will readily occur to one skilled in the art.

What is claimed is:

1. Apparatus for automatically reading line-trace characters comprising means for scanning in an expanding circular path a field which includes a line-trace character, means for sequentially detecting intersections of said scanning path with those portions of said character which are equidistant from the origin of the expanding circular scan, said means including means for producing output signals corresponding to said intersections, and means for analyzing the output signals produced in a complete scan of said character to produce indicia representative of said character.

2. Apparatus for automatically reading line-trace characters comprising means for scanning a field which includes a line-trace character, said scanning means arranged to interrogate said character in a dilating circular path thereby to produce in sequence a plurality of signals representative of intersections of said scanning path with portions of said character whose elements are equidistant from the center of the dilating scan, and means for analyzing said signals produced in a complete scan of said character to produce a coded signal representative of said character.

3. Apparatus for automatically reading line-trace characters comprising means for scanning a field which includes a line-trace character with an expanding substantially circular sweep originating at substantially the center of said character and extending beyond the outer limits of said character, means for sequentially detecting all intersections of said circular sweep with portions of said character as said scanning proceeds from the center of said character outward, and means for analyzing the output signals produced in a complete scan of said character to produce indicia for identifying said character.

4. Apparatus for automatically reading line-trace characters comprising means for systematically examining a field which includes a line-trace character, said examining means including a transducer comprising a plurality of photoresponsive elements arranged in $c$ concentric rings of $r$ elements each, the corresponding elements of said rings being arranged along $r$ radii, means for sequentially interrogating said rings of elements to detect voltage conditions therein indicative of the position of visible trace portions in said field, and analyzing means for producing from all of said voltages obtained in an examination of the elements in all of said rings a signal relationship uniquely related to said line-trace character.

5. In combination with apparatus as defined in claim 4, means for programming said analyzing means to produce a signal relationship representative of individual epicenters of activity in said line-traces as said epicenters grow in predefined patterns as a censequence of the sequential interrogation of said rings.

6. In combination with apparatus as defined in claim 4, means for programming said analyzing means to produce a signal relationship representative of the number of sharp discontinuities in the derivative of said line-trace.

7. In combination with apparatus as defined in claim 4, means for programming said analyzing means to produce a signal relationship representative of the occurrence of multivalued functions in said voltages, said functions being representative of line-trace portions of said character and occurring in the form of voltages at a plurality of elements in at least one of the $r$ radii of photoresponsive elements.

8. In combination with apparatus as defined in claim 4, means for programming said analyzing means to detect the occurrence of both single-valued and multi-valued functions representative of line-trace portions of said character.

9. In combination with apparatus as defined in claim 4, means for programming said analyzer means to produce a signal relationship representative of the slope both of single-valued and multi-valued functions in said voltages.

10. Apparatus for automatically reading quasi-continuous line-trace characters within a field of view independent of precise centering or rotation of said characters, which comprises means for scanning a character within said field in a dilating concentric pattern originating at approximately the center of said character, means for sequentially sensing all intersections of said scanning means with portions of said character, means for developing a voltage for each sensed portion whose magnitude is proportional to the displacement of said portion from said center, means for analyzing said voltage magnitudes and displacements to detect predefined patterns therein, and individual means each sensitive to the detection of one of said patterns for indicating the presence of said one of said patterns.

11. Apparatus for automatically classifying a visible line-trace character within a field of view, comprising in combination, scanning means comprising a plurality of sensing elements each adapted to sense the presence of visible line-trace portions in an exclusive pre-established segment of said field and to produce signals representative thereof, means for focusing said field on said scanning means, means for sequentially connecting to register means preselected ones of said sensing elements together forming substantially concentric rings about a point near the center of a character within said field, means included in said register means for recording the relative times of occurrence of signals representative of sensed character portions within pre-established segments as said concentric rings of said sensing elements are sequentially connected to said register, means activated after all of said sensing elements have been connected to said register for transferring said recorded voltages to comparator means, means included in said comparator means for detecting prescribed signal relationships within said recorded voltages, means supplied with signal voltages according to said relationships for producing an output signal uniquely related to said recorded voltages, and means responsive to said output signal for producing therefrom unique activity indicative of said signal relationship.

12. Apparatus for automatically recognizing line-trace characters representative of alpha-numeric characters comprising means for scanning a field which includes a character to be recognized, said scanning means arranged to interrogate said character in a dilating circular path originating at a point near the center of said character thereby to produce a sequence of signals representative of successive intersections of said scanning path with portions of said character lying in segmented portions of said field, first means responsive to said signals for establishing potentials indicative of first signals occurring in individual segments of said field during an entire scan, function generator means supplied with said potentials indicative of said first signal for developing potentials proportional to the relative times of occurrence of said signal in said individual segments of said field, first comparator means supplied with said potentials indicative of said times of occurrence for generating output signals corresponding to prescribed relationships of said applied potentials, second means responsive to said signals for establishing potentials indicative of second signals occurring in individual segments of said field during said entire scan, means for deriving from the potentials indicative of said second signals manifestations of the occurrence of intersections of said scanning path with portions of said character lying in contiguous prescribed segment portions only of said field, and a plurality of means each associated respectively with one character of an ensemble of characters for producing, in response to the occurrence in one complete scan of said field of both a selected output signal generated in said first comparator for a prescribed relationship of potentials and selected signals indicative of prescribed manifestations of a second contiguous segment portion, coded signals respectively representative of said occurrences.

13. Apparatus for automatically recognizing line-trace characters as defined in claim 12 wherein said means responsive to said signals for establishing potentials indicative of said second signals includes means for delaying for a prescribed time interval the interrogation of said second signals by said second means.

14. Apparatus for automatically recognizing line-trace characters as defined in claim 12 wherein said plurality of means for producing coded signals include means responsive to the occurrence of output signals and signals indicative of prescribed manifestations selected in accordance with rules defining the characters of an ensemble of Arabic numerals.

15. Apparatus for automatically recognizing line-trace characters as defined in claim 12 in combination with second function generator means supplied with potentials indicative of said first and said second signals occurring in individual segments of said field during an entire scan for developing potentials proportional to the relative times of occurrence of said second signals, second comparator means supplied with said potentials indicative of said times of occurrence of said second signals for generating output signals corresponding to prescribed relationships of said applied second signals, and means responsive both to the occurrence of selected coded signals and selected output signals corresponding to prescribed relationships of said second signals for producing coded signals representative respectively of said occurrences, said selections being made in accordance with rules defining the characters of an ensemble of letters of the English alphabet.

16. Apparatus for automatically classifying line-trace characters comprising, in combination, means for sequentially examining, in a field of view, portions of said field whose elements are located at substantially equal distances from a common center, for visible indicia representative of portions of a line-trace character positioned within said field, the order of examination being according to the distances of said elements from said center, means responsive to said indicia for producing output signals representative thereof, and means for analyzing said output signals to produce indicia representative of said character.

17. Apparatus for automatically classifying line-trace characters comprising, in combination, means for sequentially examining, in a field of view, portions of a line-trace character whose elements are located at substantially equal distances from a common center, for visible indicia representative of portions of said character, the order of examination being according to the distances of said portions from said center, means responsive to said indicia for producing output signals representative thereof, and means for analyzing said output signals to produce indicia representative of said character.

18. Apparatus for automatically reading alpha-numeric characters comprising, in combination, means for sequentially examining, in a field of view, portions of an alpha-numeric character whose elements are located at substantially equal distances from a common center, for indicia representative of portions of said character, in order according to the distances of said portions from said center, means responsive to said indicia for producing output signals representative thereof, and means sensitive to said output signals for analyzing said indicia.

References Cited in the file of this patent

UNITED STATES PATENTS

| | | |
|---|---|---|
| 2,682,043 | Fitch | June 22, 1954 |
| 2,723,308 | Vroom | Nov. 8, 1955 |
| 2,838,602 | Sprick | June 10, 1958 |
| 2,889,535 | Rochester | June 2, 1959 |

FOREIGN PATENTS

| | | |
|---|---|---|
| 215,060 | Australia | Jan. 23, 1958 |